(12) United States Patent
Gerards et al.

(10) Patent No.: US 9,217,377 B2
(45) Date of Patent: Dec. 22, 2015

(54) VALVE DEVICE FOR CONTROLLING AN EXHAUST GAS FLOW OF AN INTERNAL COMBUSTION ENGINE

(75) Inventors: Hans Gerards, Gangelt (DE); Harald Blomerius, Cologne (DE)

(73) Assignee: PIERBURG GMBH, Neuss (DE)

( * ) Notice: Subject to any disclaimer, the term of this patent is extended or adjusted under 35 U.S.C. 154(b) by 34 days.

(21) Appl. No.: 14/127,491

(22) PCT Filed: May 25, 2012

(86) PCT No.: PCT/EP2012/059854
§ 371 (c)(1),
(2), (4) Date: Dec. 19, 2013

(87) PCT Pub. No.: WO2013/000643
PCT Pub. Date: Jan. 3, 2013

(65) Prior Publication Data
US 2014/0117267 A1 May 1, 2014

(30) Foreign Application Priority Data
Jun. 28, 2011 (DE) .......................... 10 2011 106 744

(51) Int. Cl.
*F16K 1/22* (2006.01)
*F02D 9/10* (2006.01)
*F16K 1/226* (2006.01)

(52) U.S. Cl.
CPC .............. *F02D 9/1005* (2013.01); *F02D 9/101* (2013.01); *F02D 9/107* (2013.01); *F02D 9/1075* (2013.01); *F16K 1/222* (2013.01); *F16K 1/2261* (2013.01)

(58) Field of Classification Search
CPC ... F02D 9/1005; F02D 1/2261; F02D 9/1015; F02D 9/101
USPC ........................................ 251/305, 306, 308
See application file for complete search history.

(56) References Cited

U.S. PATENT DOCUMENTS

| 5,634,625 | A | * | 6/1997 | Bruno ........................ 251/313 |
| 6,598,854 | B1 | | 7/2003 | Jessberger et al. |
| 2004/0021119 | A1 | * | 2/2004 | Hattori ...................... 251/306 |
| 2004/0031945 | A1 | | 2/2004 | Krimmer et al. |
| 2009/0050106 | A1 | * | 2/2009 | Bessho ...................... 123/337 |

FOREIGN PATENT DOCUMENTS

| DE | 198 48 440 A1 | 4/2000 |
| DE | 102 26 594 A1 | 1/2004 |
| EP | 1 455 124 A1 | 9/2004 |
| EP | 1 489 285 A2 | 12/2004 |

(Continued)

*Primary Examiner* — John K Fristoe, Jr.
*Assistant Examiner* — Kelsey Rohman
(74) *Attorney, Agent, or Firm* — Norman B. Thot

(57) ABSTRACT

A valve device for controlling an exhaust gas flow of an internal combustion engine includes a housing comprising a channel which has the exhaust gas flow therethrough. A shaft is disposed in the housing. The shaft is rotatably mounted about a shaft axis. A flap is connected to the shaft. The flap controls a flow cross section of the channel. The flap comprises two flexurally rigid support plates. The support plates each comprise an outer periphery. An elastic flap body is arranged between the support plates. The elastic flap body comprises an outer periphery which is larger on all sides than the outer periphery of the support plates. A distance between the outer periphery of the elastic flap body and the outer periphery of the support plates is largest in an area of the shaft axis, and smallest at an angle of 90° relative to the shaft axis.

10 Claims, 2 Drawing Sheets

(56) References Cited

FOREIGN PATENT DOCUMENTS

| | | | |
|---|---|---|---|
| EP | 1 707 780 A1 | 10/2006 | |
| JP | 7-279676 A | 10/1995 | |
| JP | 2004-316549 A | 11/2004 | |
| JP | 2006-105094 A | 4/2006 | |
| JP | 2007-56826 A | 3/2007 | |
| JP | 2008-121803 A | 5/2008 | |
| WO | WO 2009/103893 A2 | 8/2009 | |

* cited by examiner

VALVE DEVICE FOR CONTROLLING AN EXHAUST GAS FLOW OF AN INTERNAL COMBUSTION ENGINE

CROSS REFERENCE TO PRIOR APPLICATIONS

This application is a U.S. National Phase application under 35 U.S.C. §371 of International Application No. PCT/EP2012/059854, filed on May 25, 2012 and which claims benefit to German Patent Application No. 10 2011 106 744.6, filed on Jun. 28, 2011. The International Application was published in German on Jan. 3, 2013 as WO 2013/000643 A1 under PCT Article 21(2).

FIELD

The present invention relates to a valve device for controlling an exhaust gas flow of an internal combustion engine. The valve device includes a shaft that is rotatably mounted about a shaft axis in a housing containing a channel for a flow. The valve device also includes a flap that is connected to the shaft with which the flow cross section of the channel can be controlled. The flap includes two flexurally rigid support plates with a first periphery and an elastic flap body with a larger periphery on all sides that is arranged between the support plates.

BACKGROUND

Valve devices of the above type can be used, for example, as exhaust gas return flaps or exhaust gas flaps. Such flaps can also be used as throttle flaps in air-conducting conduits. When using such valve devices as an exhaust gas return flap, the tightest possible closure of the channel in the closed state of the flap is required on the one hand, and, on the other hand, a good controllability of the volume flow is needed. Care must further be taken to obtain a sufficient thermal endurance in the hot exhaust gas tract.

There are various designs of such multi-part flaps which are intended to improve the sealing tightness in the closed state.

EP 1 455 124 A1, for example, describes a flap valve for a gas- or liquid-conducting conduit which is eccentrically supported and consists of a flexurally rigid element arranged on the outflow side and an elastic spring sheet arranged on the inflow side. In the housing, an abutment edge is formed which is abutted by the spring sheet in the closed state. In this arrangement, one half of the spring sheet has the same size as the flexurally rigid element, wherein this half is biased in a direction leading away from the flexurally rigid element so that the spring sheet, when laid onto the abutment edge, is pressed with tension against the abutment portion. The other half of the spring sheet is larger than the flexurally rigid element so that this side can also abut on the abutment portion formed in the opposite direction within the channel. A possible distortion of the spring sheet is restricted by the abutment of the flexurally rigid element.

EP 1 489 285 A2 describes a flap valve which can be used as a throttle flap and is made of two support plates and an elastomeric plate arranged between the support plates, the elastomeric plate extending on all sides beyond the periphery of the support plates and, in the closed state of the flap, abutting by its outer periphery on the inner wall of the channel. This flap, however, is not suited for use in the exhaust gas area because the elastomer does not have the required thermal endurance.

The disadvantages of the previous designs are that relatively high actuating forces are necessitated to safeguard a sufficient sealing tightness of the valve device in the closed state.

SUMMARY

An aspect of the present invention is to provide a valve device having a minimum leakage corresponding to the smallest possible actuating forces. A further aspect of the present invention is to provide a valve device which can be produced in an inexpensive manner with good control characteristics.

In an embodiment, the present invention provides a valve device for controlling an exhaust gas flow of an internal combustion engine which includes a housing comprising a channel configured to have the exhaust gas flow therethrough. A shaft is disposed in the housing. The shaft is mounted about a shaft axis so as to be rotatable. A flap is connected to the shaft. The flap is configured to control a flow cross section of the channel. The flap comprises two support plates configured to be flexurally rigid. The two support plates each comprise an outer periphery. An elastic flap body is arranged between the two support plates. The elastic flap body comprises an outer periphery configured to be larger on all sides than the outer periphery of the two support plates. A distance between the outer periphery of the elastic flap body and the outer periphery of the two support plates is largest in an area of the shaft axis, and smallest at an angle of 90° relative to the shaft axis.

BRIEF DESCRIPTION OF THE DRAWINGS

The present invention is described in greater detail below on the basis of embodiments and of the drawings in which.

DETAILED DESCRIPTION

Figure 1:
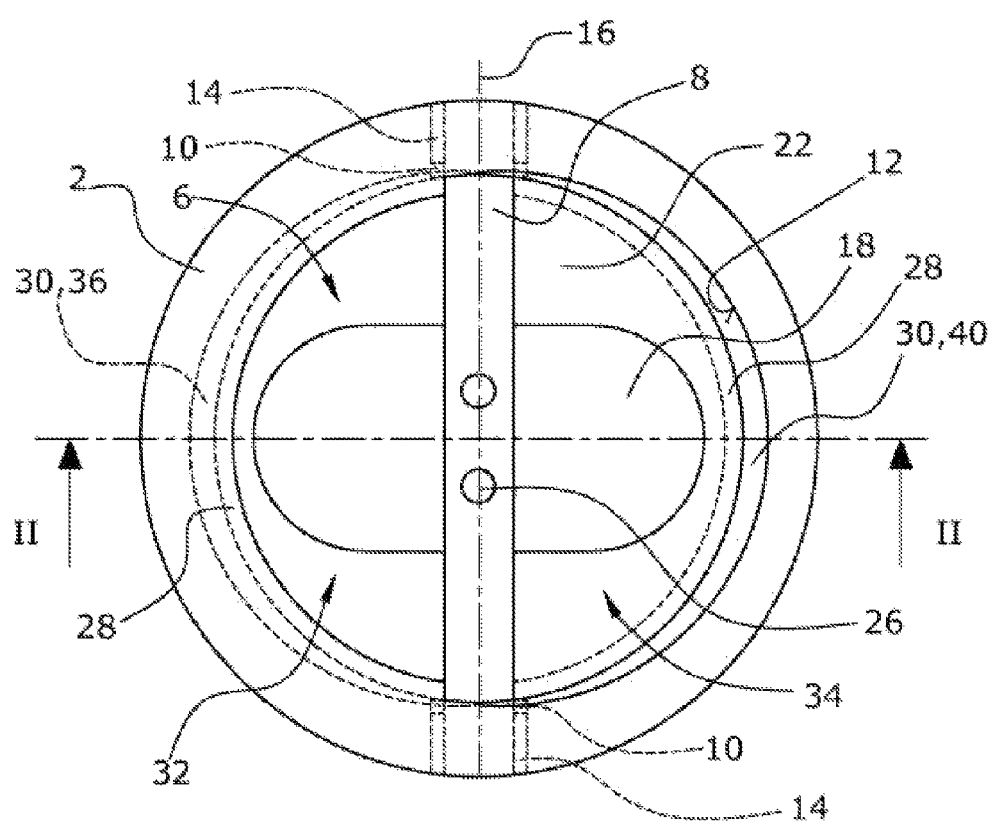
FIG. 1 shows a plan view of a valve device of the present invention.
Figure 2:
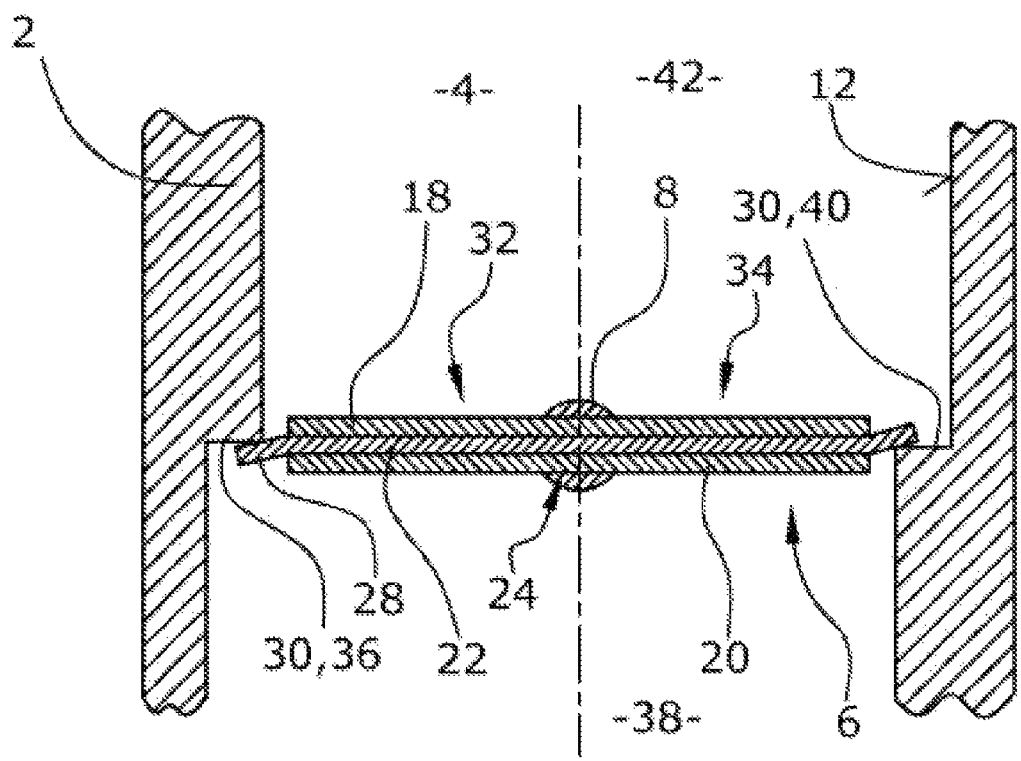
FIG. 2 shows a lateral sectional view of the valve device of the present invention according to FIG. 1.

In an embodiment of the present invention, because the distance between the outer periphery of the elastic flap body and the outer periphery of the support plates is largest in the area of the shaft axis and smallest at an angle of 90° relative to the shaft axis, the elasticity is largest in the area close to the shaft where, due to the small lever arm, the largest torques must be applied for pressing the flap bodies against a housing wall. As a result, a tight closure is accomplished by a press-on force which is to be applied, while relatively small actuating forces of the actor will be required.

In an embodiment of the present invention, the distance between the outer periphery of the elastic flap body and the outer periphery of the support plates can, for example, decrease with an increasing angle relative to the point of intersection of the shaft axis and the channel axis, so that, with an increasing distance from the shaft axis, a continuous reduction of the elasticity is effected. A continuous press-on force can thus be applied over the entire periphery.

In an embodiment of the present invention, the channel and the flap body are circular in cross section, and the support plates are substantially elliptic or shaped as a circle expanded in one direction. These shapes can be produced and mounted in an easy manner.

The flap body can, for example, be made of spring steel. Spring steel has a high thermal endurance, thus allowing its use in the exhaust gas channel.

In an embodiment of the present invention, a ledge can, for example, be formed in the housing on which an outer edge of the flap body is supported in the closed state of the flap. A reliable sealing is thus achieved even in case of a reduced tolerance sensitivity in the production and assembly process of the individual component parts.

In an embodiment of the present invention, a section of the channel located downstream relative to the flap and an upstream section of the channel can be arranged at a radial offset relative to each other at the level of the shaft axis, whereby identical flow cross sections are also achieved in regard to the use of the ledge within the channel, so that, in the opened state, no change of the flow characteristic upstream and downstream of the valve will occur.

In an embodiment of the present invention, the shaft axis can, for example, divide the flap body into a first flap half and a second flap half, wherein the first flap half is supported on a surface of the ledge that faces in the flow direction, and the second flap half is supported on a surface of the ledge that faces in a direction opposite to the flow direction. While using a centrically supported flap which can be produced at low cost, there can thus be effected a circumferential support on a surface for sealing purposes.

In an embodiment of the present invention, the axial distance of the two surfaces of the ledge can, for example, be smaller than the thickness of the flap body so that, in the vertical position of the flap body in the channel, an additional press-on force is exerted on the surface by means of the flap body, resulting in an improved sealing in the closed state. Primarily in connection with the higher elasticity in the area close to the shaft, it is possible to thereby achieve a largely leak-free closure while merely applying low actuating forces. A clattering of the flap in the channel is further prevented.

In the closed state of the flap, the flap body further has a slight distance to the radially adjacent inner wall of the channel. This makes it possible to produce the component parts with the tolerances required for the different temperature-induced expansions and will thus providing for inexpensive production and assembly. Depending on the distance, one can also achieve a changed flow characteristic while using small opening angles.

The support plates are arranged fully within the inner periphery of the ledge in order to make possible that the press-on force applied onto the surface of the ledge can be completely exerted via the edge of the flap body. The applied press-on force is thus not limited.

In an embodiment of the present invention, a valve device is provided by which a tight abutment of the flap is achieved along the full periphery of the flap while only small torques have to be exerted. The flap can be produced and mounted in an inexpensive manner because no narrow tolerances need be observed. This valve device will tend neither to become wedged nor to become clogged.

The valve device in accordance with the present invention comprises a housing 2 in which a channel 4 is formed for throughflow of exhaust gas, for example. Internally of channel 4, a flap 6 is arranged for controlling the flow cross section, the flap being controlled by an actuator (not shown). For this purpose, the actuator is connected to a shaft 8 supported at support sites 14 in housing 2.

On both sides of channel 4, the shaft 8 extends into the support sites 14 through shaft passages 10 formed in a wall 12 of housing 2 on opposite sides of channel 4, with channel 4 being divided into two halves by a shaft axis 16 about which the flap 6 can be rotated.

The flap 6 arranged in the interior of channel 4 comprises two flexurally rigid support plates 18, 20 and an elastic flap body 22 of spring steel arranged between the support plates 18, 20. The two support plates 18, 20 and the flap body 22 are disposed immediately above each other and are arranged in a slot 24 in shaft 8, and they are fastened by screws 26.

In the closed state of flap 6, an outer edge 28 of flap body 22 is supported on a ledge 30 formed in housing 2. The flap 6 is divided by the shaft axis 16 into a first half 32 and a second half 34, the first half 32 being supported by its edge on a first surface 36 of ledge 30 that is facing toward a downstream section 38 of channel 4, and the second half 34 being supported by its edge on a second surface 40 of ledge 30 that is facing toward an upstream section 42 of channel 4. From this, the downstream section 38 relative to the upstream section 42 also has a radial offset at the level of the shaft axis 16 so as to obtain identical flow cross sections of the two channel sections 38, 42. Between the radially adjacent inner wall 12 of channel 4 and the edge 28 of flap body 22, a slight distance remains because a reliable and leakage-free sealing is already provided by the abutment of flap body 22 on ledge 30. On the other hand, the two support plates 18, 20 are only large enough to the effect that, in the closed state, their entire surface is arranged within the flow cross section of the downstream section 38 and of the upstream section 42 of channel 4 so that, in radial direction, the support plates 18, 20 terminate before the surfaces 36, 40 of ledge 30.

In the shown embodiment, the distance of the surfaces 36, 40 of ledge 30 is smaller than the thickness of flap body 22, and the axial distance from these two surfaces 36, 40 to the shaft axis 16 is identical, so that, with the flap 6 arranged orthogonally to the shaft axis 16, the flap body 22 is, by means of spring force, pressed by its edge 28 against the surfaces 36, 40, thus providing a further improvement of the sealing tightness in the closed state.

In an embodiment, channel 4 (just as flap body 22) is of a circular cross section. The support plates 18, 20, however, as evident from FIG. 1, are shaped substantially as a circle expanded in one direction, wherein the largest extension of the ellipse is formed orthogonally to the shaft axis 16 and the smallest extension exists at the level of the shaft axis 16. From this, the distance between the outer periphery of the elastic flap body 22 and the outer periphery of the support plates 18, 20 is largest in the area of the shaft axis 16 and is smallest at an angle of 90° relative to the shaft axis 16. The portion of the non-covered surface of the flap body 22 relative to the total surface of flap body 22 further becomes smaller with increasing distance from the shaft axis 16 to the end of the support plates 18, 20. In other words, according to the present invention, the distance between the outer periphery of the elastic flap body 22 and the outer periphery of the support plates 18, 20 decreases with increasing angle relative to the point of intersection between the shaft axis 16 and the channel axis, whereby the elasticity of the flap 6 decreases with increasing angle.

Based on all of the above, the flap 6 has a higher elasticity in the area of the shaft axis 16 than in the area remote from shaft axis 16. Due to the short lever arm in the area close to the axis, the flap body 22 can thus be deformed by means of relatively small torsional moments when abutting on the surfaces 36, 40 of ledge 30, thus effecting a high sealing tightness while merely requiring low actuating forces. In this situation, the valve body is brought into abutment on the surfaces 36, 40 over the whole periphery whereby the leakage of the valve device is minimized. At the same time, this clamping effect will prevent a clattering of the flap 6 in channel 4 caused by occurrence of pressure pulsations. By well-aimed selection of the distance of the flap body 22 from the adjacent inner wall 12 of channel 4, it is also possible to adapt the flow characteristic in the range of small angles of attack. In comparison to known designs, the tolerance sensitivity is distinctly lower so that the valve device can be produced at low cost.

It should be understood that the scope of protection of the present application is not restricted to the described exemplary embodiment. With respect to the precise design, various constructional modifications are possible within the protective scope, for example, concerning the mutual distance of the surfaces or the specific shape of the support plates. It can also be contemplated to design such flap in a corresponding manner for use in non-round channels. Reference should be had to the appended claims.

What is claimed is:

1. A valve device for controlling an exhaust gas flow of an internal combustion engine, the valve device comprising:
    a housing comprising a channel configured to have the exhaust gas flow therethrough, the channel comprising a channel axis;
    a shaft disposed in the housing, the shaft being mounted about a shaft axis so as to be rotatable; and
    a flap connected to the shaft, the flap being configured to control a flow cross section of the channel, the flap comprising two support plates configured to be flexurally rigid, the two support plates each comprising an outer periphery, and an elastic flap body arranged between the two support plates, the elastic flap body comprising an outer periphery configured to be larger on all sides than the outer periphery of the two support plates,
    wherein, a distance between the outer periphery of the elastic flap body and the outer periphery of the two support plates is largest in an area of the shaft axis, is smallest at an angle of 90° relative to the shaft axis, and decreases with an increasing angle off the shaft axis.

2. The valve device as recited in claim 1, wherein the channel and the elastic flap body each comprise a circular cross section, and the two support plates each comprise an elliptical cross section or a cross section which is shaped as a circle expanded in a direction.

3. The valve device as recited in claim 1, wherein the elastic flap body comprises a spring steel configured to be temperature-resistant.

4. The valve device as recited in claim 1, wherein the elastic flap body further comprises an outer edge, the housing further comprises a ledge formed therein, and the outer edge is supported on the ledge when the flap is in a closed state.

5. The valve device as recited in claim 4, wherein the housing further comprises a downstream section disposed downstream relative to the flap and an upstream section disposed upstream relative to the flap, the downstream section and the upstream section being disposed at a radial offset relative to each other at a level of the shaft axis.

6. The valve device as recited in claim 5, wherein the ledge comprises a first surface configured to face a direction of flow of the exhaust gas and a second surface configured to face a direction which is opposite to the direction of flow of the exhaust gas, the elastic flap body is divided into a first flap half and a second flap half by the shaft axis, the first flap half is supported on the first surface, and the second flap half is supported on the second surface.

7. The valve device as recited in claim 6, wherein an axial distance between the first surface and the second surfaces is slightly smaller than a thickness of the elastic flap body.

8. The valve device as recited in claim 4, wherein the ledge comprises an inner periphery, and the two support plates are each disposed entirely within the inner periphery.

9. The valve device as recited in claim 1, wherein the channel comprises a radially adjacent wall and, when the flap is in a closed state, a distance exists between the elastic flap body and the radially adjacent wall.

10. A valve device for controlling an exhaust gas flow of an internal combustion engine, the valve device comprising:
    a housing comprising a channel configured to have the exhaust gas flow therethrough, the channel comprising a channel axis;
    a shaft disposed in the housing, the shaft being mounted about a shaft axis so as to be rotatable; and
    a flap connected to the shaft, the flap being configured to control a flow cross section of the channel, the flap comprising two support plates configured to be flexurally rigid, the two support plates each comprising an outer periphery, and an elastic flap body sandwiched between the two support plates so that the two support plates do not contact each other, the elastic flap body comprising an outer periphery configured to be larger on all sides than the outer periphery of the two support plates,
    wherein, a distance between the outer periphery of the elastic flap body and the outer periphery of the two support plates is largest in an area of the shaft axis, is smallest at an angle of 90° relative to the shaft axis, and decreases with an increasing angle off the shaft axis.

* * * * *